United States Patent Office 2,819,262
Patented Jan. 7, 1958

2,819,262

DIAZEPINE DERIVATIVE AND METHOD OF PREPARATION

Ken Matsuda, Stamford, Conn., assignor to American Cyanamid Company, New York, N. Y., a corporation of Maine No Drawing. Application April 15, 1957
Serial No. 652,672

2 Claims. (Cl. 260—239)

This invention relates to a new and novel bis(1,3-diazepine), and to a method of preparing the same. More particularly, it is concerned with the preparation of a bis(1,3-diazepine) represented by the structure:

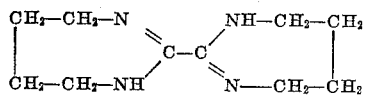

The above structure is generally designated as: 2,2'-bis-(4,5,6,7-tetrahydro-1,3-diazepine). As defined, the diazepine is characterized as a cream-colored to colorless solid. It has a M. P. of 91° C.–92.5° C. and is soluble in a variety of solvents such as: acetonitrile, benzene, chloroform and dioxane.

According to the present invention, the defined diazepine can be prepared in a surprisingly straight-forward manner by reacting tetramethylene diamine with cyanogen in an alcoholic menstruum. During reaction, the contents are cooled to a temperature below about 10° C. for from about fifteen minutes to about one and one half-hours. Without separating the resultant reaction product from the alcoholic menstruum, it is next heated under reflux conditions to eliminate ammonia, thereby forming the desired diazepine.

In prior attempts, the diazepine could not be formed as indicated above. Rather, procedures involving the reaction of tetramethylene diamine and cyanogen in the absence of an alcoholic menstruum led to the formation of a highly unstable oxamidine which decomposes to yield cross linked polymers. Unexpectedly, such polymer formation is not detected in the process of the invention.

The compound of the invention finds utility as an antioxidant for gasoline. For instance, 2,2'-bis(4,5,6,7-tetrahydro-1,3-diazepine) in concentrations as low as 0.004% was found to increase the oxidation induction period in cracked gasoline by 34% and more.

The invention will be exemplified by the following example which should be construed as being illustrative only, and should not be taken as limitative. Unless otherwise stated, the parts given are by weight.

*Example*

To a 1 liter-3 necked flask equipped with stirrer, thermometer, reflux condenser and gas inlet tube is added a solution of 1 mol of tetramethylene diamine (88 parts) in 300 ml. absolute alcohol. This solution is cooled to 7° C. and with rapid stirring, ½ mol of cyanogen (26 parts) is added over 20 minutes. The temperature is maintained at 7° C.–8° C. The mixture is stirred for one hour at 3° C. and then heated under reflux (81.5° C.) for about 100 hours with a stream of nitrogen to remove ammonia until its evolution becomes faint. Most of the alcohol is next distilled off and 1 liter of water is added to the residue. The aqueous solution is extracted six times with ether; the ether layer is dried over anhydrous sodium carbonate; decolorized with charcoal; and evaporated to remove the ether. Forty grams of a cream-colored solid, M. P. 83° C.–90° C., is obtained. This amounts to a yield of 41% based on theory.

The crude product is purified further by solution in ether, filtration of the ether solution, treatment of the filtrate with gaseous HCl, filtration of the HCl salt, solution of the dry HCl salt in water, filtration of the aqueous solution and treatment of the aqueous solution with KOH to precipitate the free amine. This procedure is repeated and the final product, M. P. 91° C.–92.5° C., is almost colorless. Its analysis is as follows:

Calculated for $C_{10}H_{18}N_4$: C, 61.8%; H, 9.3%; N, 28.8%. Found: C, 61.50%; H, 9.54%; N, 26.66%.

While one mol of cyanogen in the alcoholic medium reacts with two mols of tetramethylene diamine, some excess of tetramethylene diamine can be used to insure completeness of reaction. Accordingly, an intermediate capable of losing ammonia is formed. In general, a temperature from about zero (0) of to about fifteen (15) degrees centigrade is a good practice to initiate this reaction.

As stated above, the refluxing step is carried out in a dilute alcoholic medium to prepare the bi-cyclic compound of the present invention. It has been found that in the absence of the alcoholic medium and the initiating reaction at below room temperature, highly cross linked polymers to the exclusion of the bi-cyclic compound do form.

I claim:

1. As a new composition of matter the compound: 2,2'-bis(4,5,6,7-tetrahydro-1,3-diazepine) represented by the general formula:

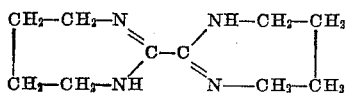

2. A process for preparing the diazepine of claim 1 which comprises: reacting one mol of tetramethylene diamine with about one-half mol of cyanogen in an alcoholic menstruum at a temperature from about 0° C. to about 15° C. for not more than about one and one half hours, then refluxing the latter reaction product in said alcoholic menstruum until the evolution of ammonia is but faintly detected, and recovering the thus-formed 2,2'-bis(4,5,6,7-tetrahydro-1,3-diazepine).

No references cited.